United States Patent
Callejero Andres

(10) Patent No.: US 9,158,110 B2
(45) Date of Patent: Oct. 13, 2015

(54) COMPACT MULTISPECTRAL SCANNING SYSTEM

(75) Inventor: Carlos Callejero Andres, Madrid (ES)

(73) Assignee: ALFA IMAGING, S.A., Madrid (ES)

( * ) Notice: Subject to any disclaimer, the term of this patent is extended or adjusted under 35 U.S.C. 154(b) by 586 days.

(21) Appl. No.: 13/502,104

(22) PCT Filed: Mar. 18, 2010

(86) PCT No.: PCT/EP2010/053558
§ 371 (c)(1),
(2), (4) Date: Jun. 29, 2012

(87) PCT Pub. No.: WO2011/045087
PCT Pub. Date: Apr. 21, 2011

(65) Prior Publication Data
US 2012/0267517 A1    Oct. 25, 2012

(30) Foreign Application Priority Data

Oct. 15, 2009  (ES) .................................. 200901996

(51) Int. Cl.
*G02B 26/10*   (2006.01)
*G02B 17/06*   (2006.01)

(52) U.S. Cl.
CPC .......... *G02B 26/105* (2013.01); *G02B 17/0605* (2013.01); *G02B 17/0694* (2013.01)

(58) Field of Classification Search
CPC .................................................... G02B 26/105
USPC ............. 250/225, 234–236; 359/212.2, 220.1
See application file for complete search history.

(56) References Cited

U.S. PATENT DOCUMENTS

| | | | |
|---|---|---|---|
| 4,387,952 A | | 6/1983 | Slusher |
| 4,871,904 A | * | 10/1989 | Metlitsky et al. ......... 235/462.38 |
| 5,416,319 A | * | 5/1995 | Messina ........................ 250/235 |
| 5,995,265 A | * | 11/1999 | Black et al. ................ 359/201.1 |
| 7,154,650 B2 | * | 12/2006 | Lettington ................. 359/201.1 |
| 2007/0253700 A1 | * | 11/2007 | Okumura ...................... 396/358 |

FOREIGN PATENT DOCUMENTS

| | | |
|---|---|---|
| EP | 0533036 | 3/1993 |
| JP | 2006 250724 | 9/2006 |
| WO | WO 03/009048 | 1/2003 |
| WO | WO 03/075554 | 9/2003 |

OTHER PUBLICATIONS

International Search Report dated Jun. 28, 2010, issued in International Application No. PCT/EP2010/053558.

(Continued)

*Primary Examiner* — Renee D Chavez
(74) *Attorney, Agent, or Firm* — Gary J. Gershik; Cooper & Dunham LLP

(57) ABSTRACT

The invention refers to a compact multispectral scanning system comprising a primary mirror (1) and secondary mirror (2), wherein the mirrors face each other, are adapted to be rotated at the same angular speed in opposite directions, and are tilted with respect to their rotation axes. The primary mirror is concave, the secondary mirror is smaller than the primary mirror and the rotation axes of both mirrors are aligned. This arrangement makes the system more compact than prior art devices and avoids the dependency of the system on the operation frequency.

17 Claims, 5 Drawing Sheets

(56) References Cited

OTHER PUBLICATIONS

Japan Patent Application Publication No. JP2000307334 (A) published Nov. 2, 2012, to Tsutomu et al., (including English Language, Abstract).

Japan Application No. JPS56137262 (A), published Oct. 27, 1981, to Takashige et al., (including English Language, Abstract).

Japan Application No. JPH09318743 (A), published Dec. 12, 1997, to Uchinda Junzo, (including English Language, Abstract).

Japan Application No. JPH2-131682, published Nov. 1, 1990, to Toyoto Motor Corp.

Jan. 26, 2014 Japanese Office Action, filed in connection with Japanese Patent Application No. 2012-533533.

Chinese Patent Application Publication No. CN1633801 (A) published Jun. 29, 2005, to Remtons et al., (including English Language, Abstract).

* cited by examiner

COMPACT MULTISPECTRAL SCANNING SYSTEM

RELATED APPLICATIONS

This application is a U.S. National Phase of International Application No. PCT/EP2010/053558, filed Mar. 18, 2010, designating the U.S. and published on Apr. 21, 2011 as WO 2011/045087, which claims priority to Spanish Patent Application No. P200901996, filed Oct. 15, 2009. The content of these applications is incorporated herein by reference in its entirety.

FIELD OF THE INVENTION

The present invention relates to the field of optical engineering and in particular to the field of scanning imaging systems. The scanning system object of this invention may operate at a frame rate sufficient to be considered real-time, and at a wide range of wavelengths, in which millimetre-, terahert-, infrared-, microwave and x-rays are included

STATE OF THE ART

A desirable requirement in any scanning imaging system is to scan the scene with a linear pattern and at the highest speed possible. A simple way of achieving this is by means of moving plane mirrors. There are various mirror-based solutions, among which are found the flapping mirror (with only one face) moved by means of different mechanisms as, for example, of galvanometric type, or a rotating polygon with multiple mirrored faces. These techniques are used in systems that operate at small wavelengths such as infrared and visible.

In the infrared the optical apertures are typically of the order of 100 mm, and with the help of lenses these are reduced to effective scanning system apertures typically an order of magnitude smaller. In millimetre-wave systems the apertures are of the order of 500 mm diameter, a size which makes it impractical to use plane flapping mirrors or rotating poligons.

It is known to achieve a linear scan pattern by the use of two reflecting discs that rotate in opposite directions at the same speed and which are inclined to their axes of rotation at an angle identical for both. A tilted, rotating and reflecting disc produces, on its own, a conical scan pattern as it rotates 360°. However, when the radiation reaches the second disc, the conical pattern may change to elliptical if the axes and the phase of rotation between the two are correctly adjusted. If the minor axis of the ellipse described by the scan patter is smaller than the resolution of the system, then the scan patter can be considered as linear, given that the resolution of the system is the minimum separation between points from the object plane, that can be distinguished in the image provided by the system.

This occurs for example in the patent "Scanning Apparatus", by Alan H. Lettington, (U.S. Pat. No. 7,154,650 B2). Said patent describes how two reflecting discs, mounted on structures with independent rotation axes and not aligned, rotate at the same speed in opposite directions. The radiation reaches one of the mirrors, which reflects it to the second mirror, which in turn reflects it back to the first mirror. This first mirror then directs the radiation to the area where the detector is located. Both mirrors are inclined with respect to their rotation axes in order to scan the scene. A linear scan is achieved when $\alpha = 2\theta \cos \phi$, where the first mirror is inclined an angle $\alpha$, the second mirror is inclined an angle $\theta$, and $\phi$ is the angle between the rotation axes of the mirrors.

The example in patent U.S. Pat. No. 7,154,650 B2 has the advantage of not needing to use any frequency selective component (linear polariser, quarter-wave plate, Faraday rotator, etc.), however the system is intrinsically large.

In patent application WO 03/009048 A1 a more compact system is achieved. The system consists of two bodies that rotate about the same axis in opposite directions at the same speed. The first body contains a polariser and two quarter-wave plates, while the second body is a mirror. The radiation reaches the first body with the appropriate polarisation to be transmitted and reflected by the second body, such that when the radiation returns to the first body the polarisation is orthogonal to the transmitted polarisation of the linear polariser, which means that it is then reflected back to the mirror (second body). After this second reflection from the mirror, the radiation has the appropriate polarisation to be transmitted by the first body and directed finally to the detector. The inclination of the first body is double that of the second, in order to compensate the number of times the radiation is reflected from each surface and obtain a linear scan. The device described in WO 03/009048 A1 allows for a more compact system than the one in U.S. Pat. No. 7,154,650 B2, but it presents two disadvantages. The first is that it cannot be used for a range of detectors (visible, infrared, millimetre-, terahertz-waves, etc.), only one frequency band. The second is that the signal-to-noise ratio worsens, mainly due to the intrinsic transmission losses in the quarter-wave plates.

SUMMARY OF THE INVENTION

The present invention proposes the use of two reflecting mirrors, a primary one with a concave surface with respect to the incoming radiation, and a secondary one, and rotating them in opposite directions at the same speed. The secondary mirror is smaller than the primary mirror. Both mirrors are tilted with respect to their rotation axes in order to scan the scene, and their rotation axes are aligned. In this way, a more compact scanning system than those previously cited is provided, while at the same time being able to operate in a wide region of the electromagnetic spectrum. Thus the scanning system will be compatible with detectors of millimetre-, terahertz-, infrared-, microwaves and x-rays. The primary mirror reflects the radiation from the scene and makes it converge, and the secondary mirror receives said concentrated radiation and focuses it on a point, linear or matrix detector.

This scanning system can also be used to simultaneously radiate the object plane and detect the radiation reflected from the object plane. The system is compatible with emitters of a wide region of the electromagnetic spectrum (i.e. mm-waves, terahertz waves, infrared radiation, x-rays, microwaves). In this case the output of an artificial source is placed in the focal plane, from where it radiates the secondary mirror that reflects radiation towards the primary mirror, where radiation is reflected towards the object plane and distributed following a scan pattern given by the inclination of both mirrors. When this radiation reaches the object plane it is then reflected. The scanning system is also provided with a detector in the focal plane (close to the emitter or even sharing the same antenna), so that the system will be simultaneously radiating the object plane and detecting the radiation (reflected and/or emitted by the object itself) from object plane, following the same scan pattern.

The rotation axes of both mirrors are aligned. The two mirrors are tilted with respect to their rotation axes and they rotate in opposite directions with the same angular velocity. The tilt of each mirror is a design parameter. This tilt with respect to the rotation axis on each mirror, along with the rotation, produces a conical scan from each mirror. As the two mirrors face each other, the rotation axes of the mirrors are aligned and the mirrors rotate at equal speeds in opposite directions, the result of the combination of these two conical scans is a linear or elliptical scan.

The surface of the primary mirror is always concave (spherical, parabolic, hyperbolic, ellipsoidal, aspheric) with the aim to converge the radiation on the secondary mirror. The surface of the secondary mirror may be plane, concave or convex (spherical, parabolic, hyperbolic, ellipsoidal, aspheric).

There are two possibilities for the location of the detector, between the two mirrors or behind the primary mirror. The first configuration facilitates the use of a plurality of detectors, thus covering a wide field of view. On the other hand, placing the detector behind the primary mirror (which is provided with an aperture) eliminates any size restriction when integrating a radiating system, as for example a radar transceiver or a ladar or lidar system. The system can thus emit radiation that it will distribute in the scene with a linear or elliptical scan pattern, and at the same time it will receive radiation as described previously.

For rotating the mirrors, either one or two motors can be provided. The system can comprise position sensors to control the relative position of the mirrors and adjust deviations, specially in case two motors are used.

Among the multiple embodiments that this invention allows there are those that use beam splitting components. These components separate the beam into two or more beams, each of which then converges on a different detector (point, linear or matrix). These embodiments can work with different polarisation states and/or in different spectral ranges. The invention can thus provide multispectral, polarimetric and spectrometric information.

BRIEF DESCRIPTION OF THE DRAWINGS

To complete the description and in order to provide for a better understanding of the invention, a set of drawings is provided. Said drawings form an integral part of the description and illustrate preferred embodiments of the invention, which should not be interpreted as restricting the scope of the invention, but just as an example of how the invention can be embodied. The drawings comprise the following figures.

DESCRIPTION OF THE INVENTION

Figure 1:
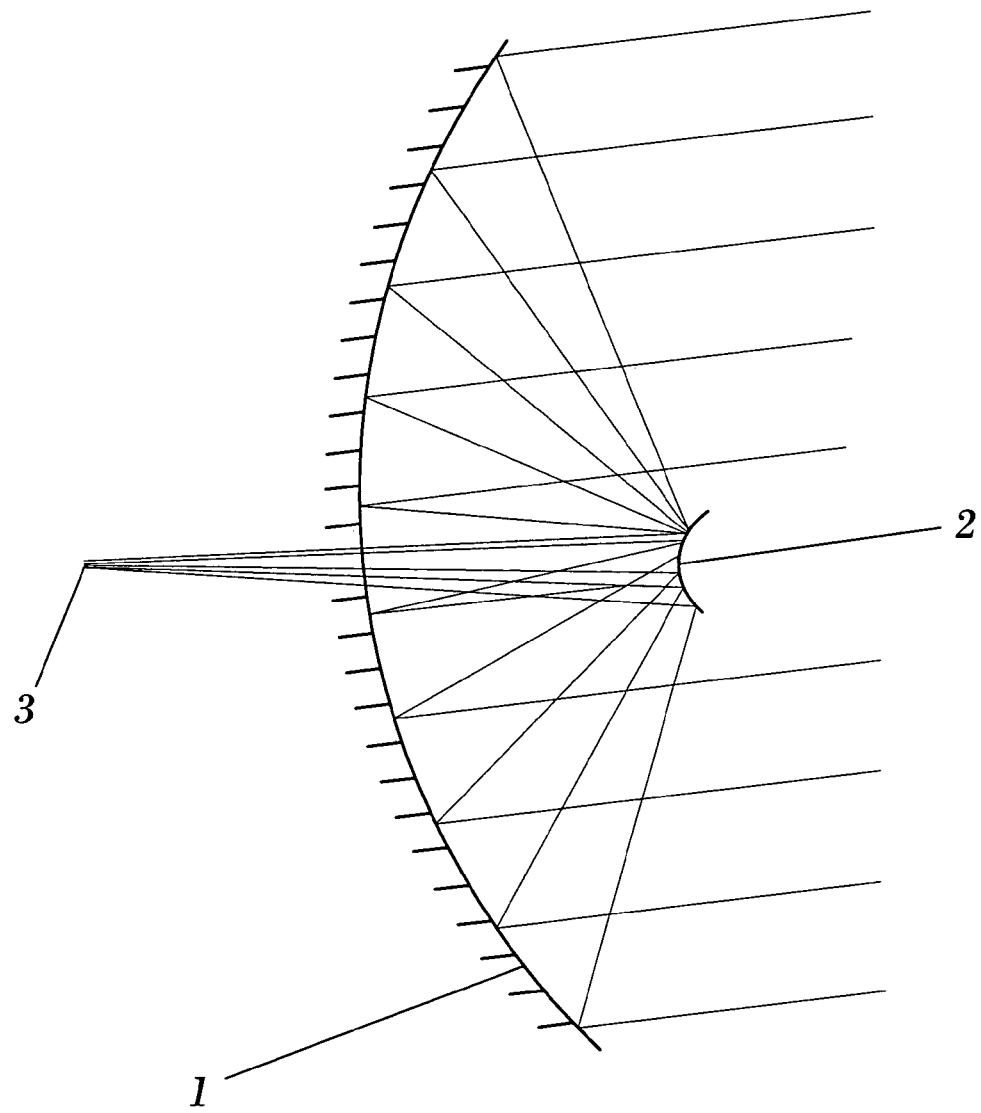
FIG. 1; shows a side view of an embodiment of the invention in which the detector is placed behind the primary mirror.

FIG. 1 shows an embodiment of the invention in which a detector is placed behind the primary mirror. The primary mirror (1) is concave, while the secondary mirror (2) is convex. The radiation focuses on the axis behind the primary mirror at the focus (3) where the detector is located. This embodiment, without being considered as a restriction to the invention, is designed to facilitate the integration of a single pixel detector and/or a radar transceiver or a LADAR or LIDAR system.

Figure 2:
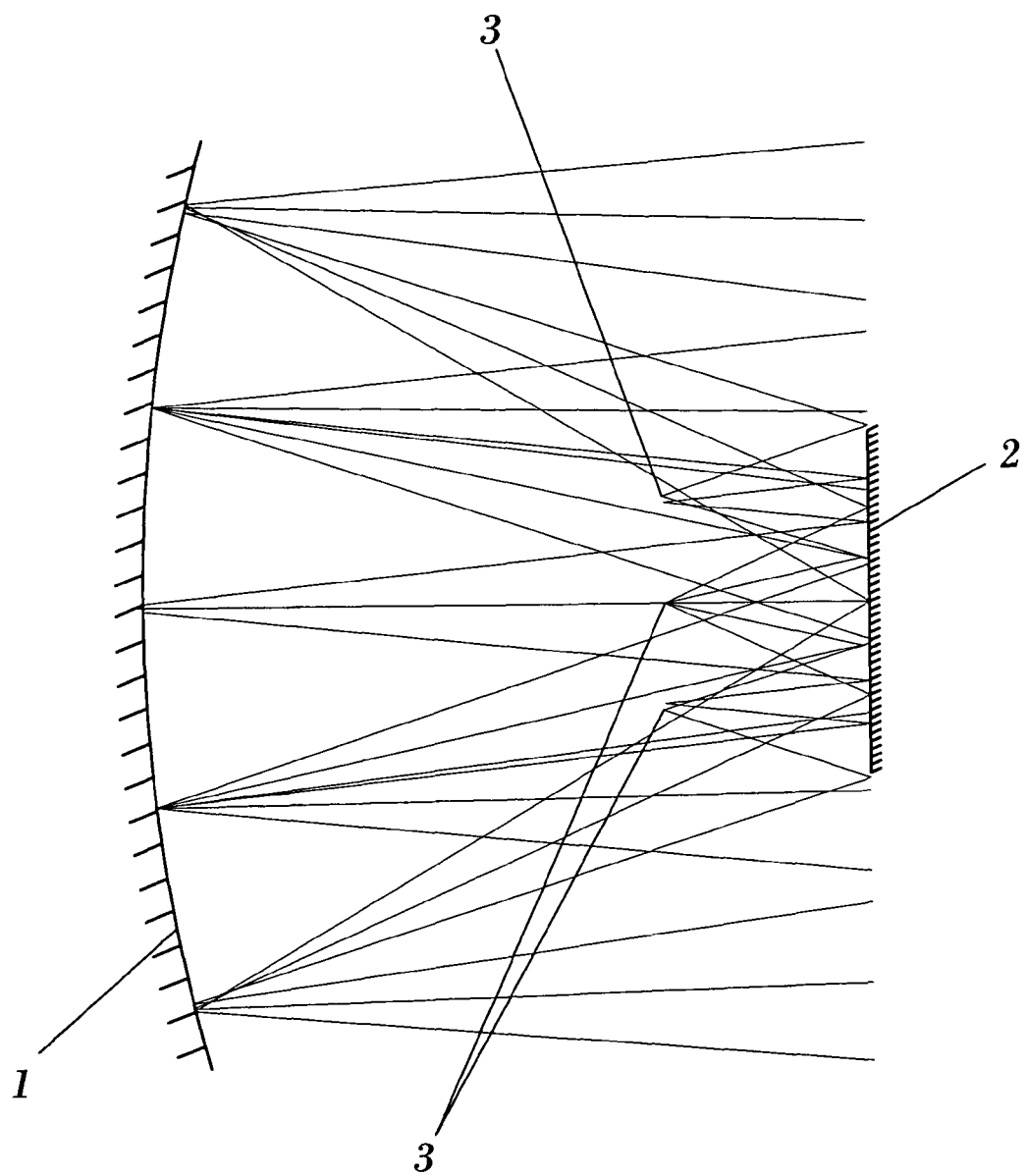
FIG. 2; shows an aerial view of another embodiment of the invention in which the detector is placed between the two mirrors.

FIG. 2 shows an embodiment of the invention in which a detector is placed between the two mirrors. In this case the primary mirror (1) is concave and the secondary mirror (2) is plane. This other possible embodiment is designed for a system that uses a line of detectors and their corresponding antennae. By placing a line of detectors in the focal plane, the system covers a field of view (in the same direction) proportional to the length of this line of detectors, despite the fact that the drawing only represents the ray trace that corresponds to the central antenna and the two antennae at either end of the line. Simultaneous, alternative or successive detection channels can be used.

Figure 3:
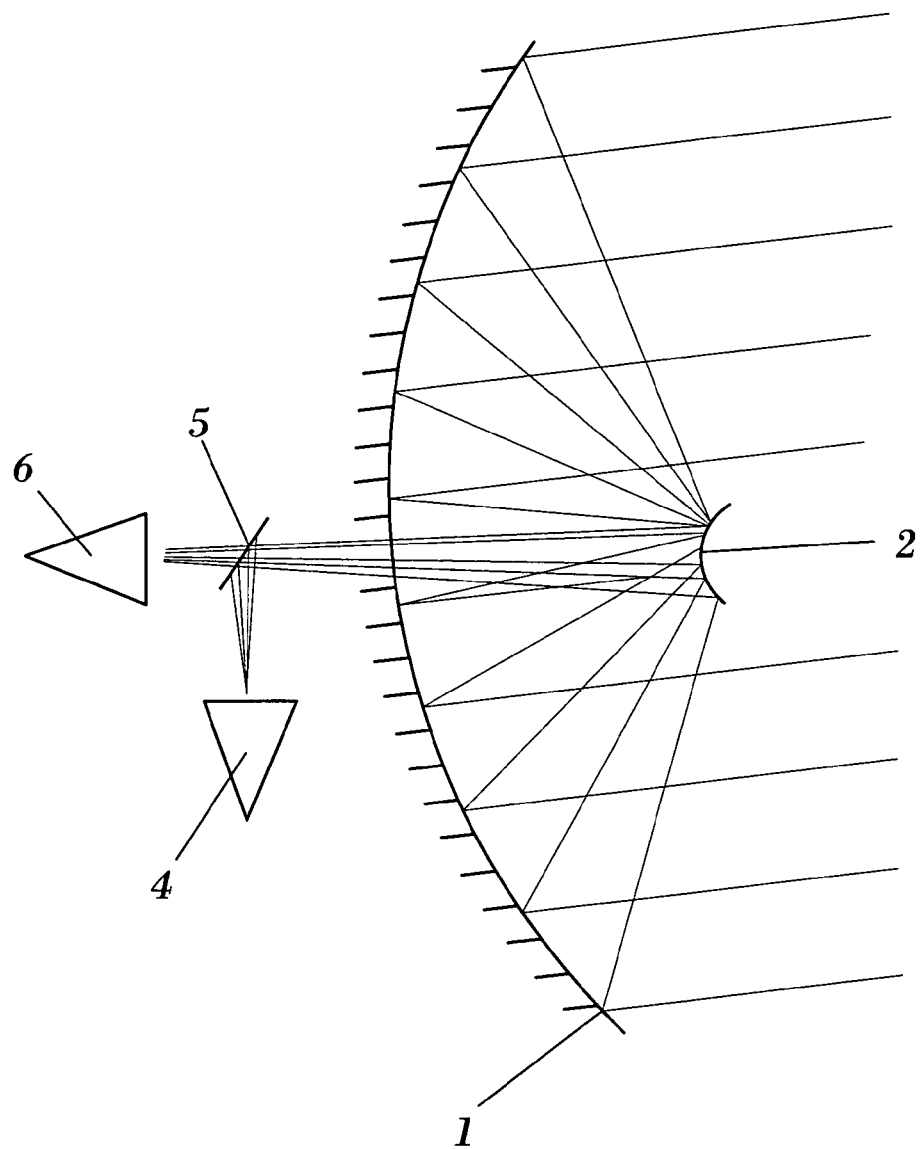
FIG. 3; shows a side view of an embodiment of the invention that uses a beam splitting device to split the beam into two with orthogonal polarisations.

FIG. 3 shows an embodiment of the invention that uses a beam splitting device to split the beam into two with orthogonal polarisations. This case is an example of the embodiment described in FIG. 1, but it could also be applied to the embodiment described in FIG. 2. The primary mirror is (1), the secondary mirror is (2). When the radiation reaches the beam splitter (e.g. linear polariser 5), this filters one electric field component (that represents approximately 50% of the energy) and rejects the orthogonal component. By placing the two antennae (4) and (6) with orthogonal polarisations, the highest amount of energy from each point of the scanned scene is integrated and consequently the thermal sensitivity in the image is improved. Another example, without limiting the invention, is to use one or several devices that separate the beam by filtering radiation of a specific wavelength (for e.g. millimetre-wave), and reflecting radiation corresponding to another wavelength (for e.g. infrared), in order to subsequently redirect each of the different beams to different detectors and thus form multispectral images.

Figure 4:
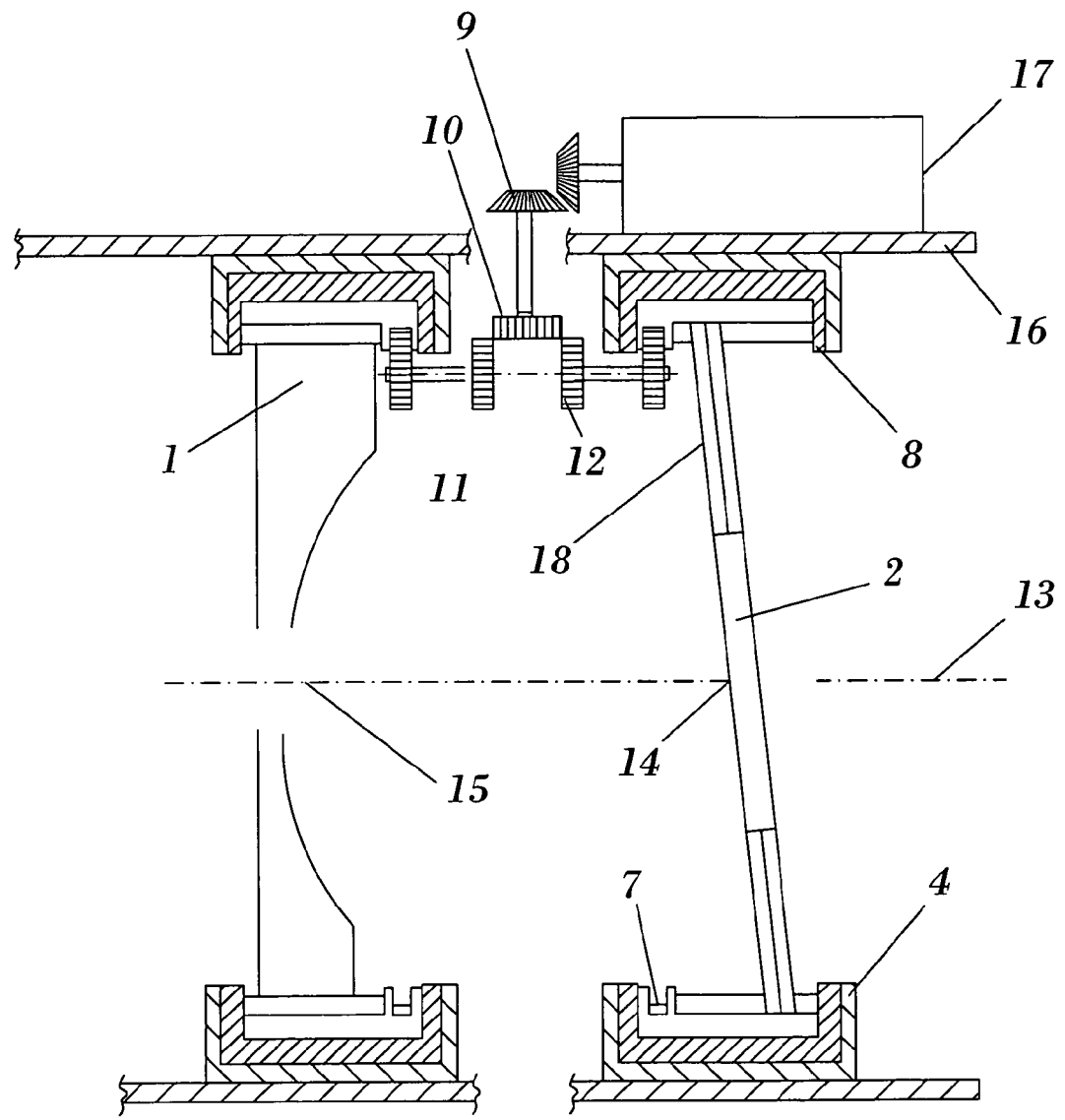
FIG. 4; shows a side view of a possible mechanical assembly for the embodiments in FIGS. 1 and 2.

FIG. 4 shows a possible mechanical assembly for the optics shown in FIGS. 1 and 2, without being considered a restriction to the invention. The primary mirror (1) has a rotation axis (13) and a normal to its surface (15). The secondary mirror (2) also has a normal (14) and a rotation axis which is aligned with the primary mirror's axis (13). In this case both mirrors (1 and 2) are mechanically enslaved via a set of transmission gears (9). The coupling to the motor (17) can be done either directly or via a first stage of the transmission at 90° with respect to the motor axis. In the following stage a crown gear (10) is rotated, which in turn transmits the rotation to another two crown gears (11 and 12) perpendicular to (10). Each of these gears is fixed to an axis, at the other end of which another crown gear is attached, which is the one that transmits the rotation to each of the rotating mirrors. Thus, only one motor is needed. An important advantage is that this embodiment allows for the detector/s to be placed both in between the two mirrors and behind the primary mirror (1), as long as a central aperture is machined in the mirror.

Figure 5:
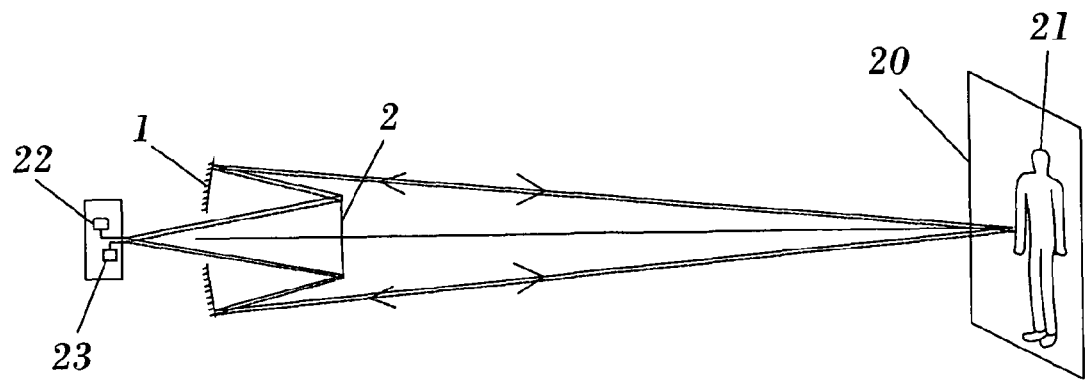
FIG. 5; shows a side view of an embodiment of the invention that radiates the object plane and simultaneously detects the radiation from the object plane, following the same scan pattern, and in accordance with FIG. 1.

FIG. 5 shows an embodiment of the invention incorporating the arrangement in FIG. 1. This embodiment is designed to radiate the object plane and simultaneously detect the radiation (emitted and reflected) from the object plane, following the same scan pattern.

In this case the output of an artificial source (22) is placed in the focal plane from where it radiates the secondary mirror (2), that reflects radiation towards the primary mirror (1) where radiation is reflected towards the object plane (20) and distributed following a scan pattern given by the inclination of both mirrors. This radiation is reflected when it reaches the object (21) at the object plane (20). The scanning system is also provided with a detector (23) in the focal plane close to the artificial source.

DESCRIPTION OF A PREFERRED EMBODIMENT OF THE INVENTION

Figure 6:
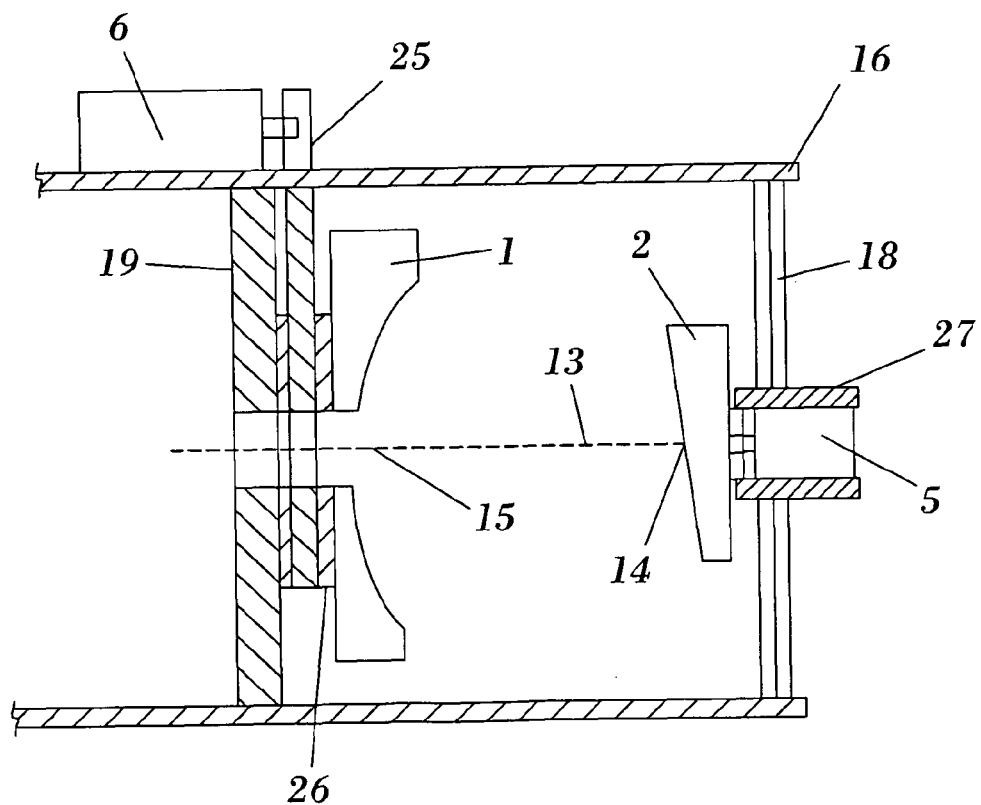
FIG. 6; shows a side view of another possible mechanical assembly for this invention in accordance with FIG. 1 or 2.

A preferred embodiment is shown in FIG. 6. The primary mirror (1) has a rotation axis (13) and a normal to its surface (15). The secondary mirror (2) also has a normal (14) and a rotation axis which is aligned with the primary mirror's axis (13). Both mirrors (1 and 2) are electronically synchronised as each is coupled to a motor that rotates them (6 and 5) and has a positioning sensor. Thus the device that governs the movement of the motors is able to detect and correct possible deviations in the synchronism. The primary mirror (1) is attached to a structure containing a bearing (26). This structure (19) is connected to the chassis (16), and includes a hole aligned with the bearing and the hole of the primary mirror, to allow the positioning of the detector and/or emitter everywhere along optical axis. The rotation of motor (6) is transmitted to mirror (1) through a transmission belt (25). The secondary mirror (2) is supported by means of a bearing and coupled directly to a motor (5). This motor is held by a metallic structure (27), and a non-metallic structure (18) connects structure (27) with the chassis (16).

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, mechanical design, etc.), within

The invention claimed is:

1. A compact multispectral scanning system comprising, a scanned object plane, a detector, an artificial radiation source placed next to the detector, a primary mirror and secondary mirror, wherein the mirrors face each other, are controlled by a mechanical assembly that rotates the mirrors at the same angular speed in opposite directions, and are tilted with respect to their rotation axes, and wherein the scanned object plane is perpendicular to the rotation axes of both mirrors, the primary mirror is concave and is arranged to reflect radiation coming directly from the scanned object plane and converge said radiation, the secondary mirror is smaller than the primary mirror and is arranged to receive said converged radiation reflected directly from the primary mirror and to reflect and direct the radiation toward the detector, and the rotation axes of both mirrors are aligned.

2. The scanning system of claim 1 wherein the primary mirror is spherical, parabolic, hyperbolic, ellipsoidal, or aspheric.

3. The scanning system of claim 1, wherein the secondary mirror is plane, concave or convex.

4. The scanning system of claim 1, wherein the detector or detectors are point, matrix or linear detectors.

5. The scanning system of claim 1, wherein the detector or detectors are placed between the primary and the secondary mirror.

6. The scanning system of claim 5 wherein the artificial radiation source placed next to the detector such that the scanned object plane can be is radiated with a linear radiation pattern.

7. The scanning system of claim 5 further comprising a motor coupled to both mirrors via transmission gears.

8. The scanning system of claim 5 further comprising two motors, each corresponding to one of the mirrors, an electronic synchronization system and position sensors.

9. The scanning system of claim 1, wherein the detector is placed behind the primary mirror at a position corresponding to the optical axis and the focal plane and the primary mirror is provided with a central aperture.

10. The scanning system of claim 9 wherein the scanned object plane is radiated with a linear radiation pattern.

11. The scanning system of claim 10 further comprising a motor coupled to both mirrors via transmission gears.

12. The scanning system of claim 9 further comprising a motor coupled to both mirrors via transmission gears.

13. The scanning system of claim 9 further comprising two motors, each corresponding to one of the mirrors, an electronic synchronization system and position sensors.

14. The scanning system of claim 1 further comprising a motor coupled to both mirrors via transmission gears.

15. The scanning system of claim 1 further comprising two motors, each corresponding to one of the mirrors, an electronic synchronization system and position sensors.

16. The scanning system of claim 1 further comprising a beam splitting device and a plurality of detectors for receiving different beams.

17. The scanning system according to claim 16 wherein the beam splitting device is a polarizer and the detectors are sensitive to different states of polarization.

* * * * *